United States Patent
Sychev et al.

(12) 
(10) Patent No.: US 11,202,082 B2
(45) Date of Patent: Dec. 14, 2021

(54) IMAGE PROCESSING APPARATUS AND METHOD

(71) Applicant: HUAWEI TECHNOLOGIES CO., LTD., Shenzhen (CN)

(72) Inventors: Maxim Borisovitch Sychev, Moscow (RU); Georgy Aleksandrovich Zhulikov, Borisoglebsky (RU); Timofey Mikhailovich Solovyev, Moscow (RU); Sergey Yurievich Ikonin, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/035,692

(22) Filed: Sep. 29, 2020

(65) Prior Publication Data

US 2021/0014511 A1 Jan. 14, 2021

Related U.S. Application Data

(63) Continuation of application No. PCT/RU2018/000207, filed on Mar. 29, 2018.

(51) Int. Cl.
*H04N 19/182* (2014.01)
*H04N 19/117* (2014.01)
(Continued)

(52) U.S. Cl.
CPC ......... *H04N 19/182* (2014.11); *H04N 19/117* (2014.11); *H04N 19/172* (2014.11); *H04N 19/513* (2014.11)

(58) Field of Classification Search
CPC .. H04N 19/117; H04N 19/172; H04N 19/182; H04N 19/513; H04N 19/523;
(Continued)

(56) References Cited

U.S. PATENT DOCUMENTS

| 2003/0098925 A1* | 5/2003 | Orlick | H04N 7/012 |
| | | | 348/448 |
| 2003/0179827 A1* | 9/2003 | Sugiyama | H04N 19/85 |
| | | | 375/240.29 |

(Continued)

FOREIGN PATENT DOCUMENTS

| EP | 2081386 A1 | 7/2009 |
| EP | 2665276 A1 | 11/2013 |

(Continued)

OTHER PUBLICATIONS

Cordula Heithausen et al., "Inter Prediction using Estimation and Explicit Coding of Affine Parameters", Joint Video Exploration Team (JVET) of ITU-T SG 16 WP 3 and ISO/IEC JTC 1/SC 29/WG 11, No. JVET-H0031, 8th Meeting: Macao, CN, Oct. 18-24, 2017, XP030151014, total 10 pages.

(Continued)

*Primary Examiner* — Gims S Philippe
(74) *Attorney, Agent, or Firm* — Rimon PC

(57) ABSTRACT

The disclosure relates to an image processing apparatus. The image processing apparatus comprises processing circuitry configured to: obtain a direction angle value associated with the target pixel (12*a-c*); select for the target pixel (12*a-c*) a plurality of primary interpolation support pixels (10*a-d*) from the array of pixels (10*a-d*) on the basis of the position of the target pixel (12*a-c*); determine pixel values of a first and a second secondary interpolation support pixels (11*ac*, 11*bd*) on the basis of the pixel values of the selected primary interpolation support pixels (10*a-d*), the direction angle value (a, b) and the position of the target pixel (12*a-c*); and determine the interpolated pixel value of the target pixel (12*a-c*) on the basis of the pixel values of the first and second secondary interpolation support pixel (11*ac*, 11*bd*) and the position of the target pixel (12*a-c*).

19 Claims, 13 Drawing Sheets

(51) Int. Cl.
*H04N 19/172* (2014.01)
*H04N 19/513* (2014.01)

(58) Field of Classification Search
CPC .... H04N 19/80; H04N 19/587; H04N 19/527; H04N 19/105
USPC .................................................. 375/240.12
See application file for complete search history.

(56) References Cited

U.S. PATENT DOCUMENTS

| | | | |
|---|---|---|---|
| 2006/0294171 | A1 | 12/2006 | Bossen et al. |
| 2010/0296587 | A1* | 11/2010 | Rusanovskyy ........ H04N 19/46 375/240.29 |
| 2012/0147967 | A1* | 6/2012 | Panchal ............... H04N 19/154 375/240.17 |
| 2012/0163460 | A1* | 6/2012 | Chien .................. H04N 19/523 375/240.16 |
| 2013/0182780 | A1 | 7/2013 | Alshin et al. |

FOREIGN PATENT DOCUMENTS

| | | |
|---|---|---|
| WO | 2019093916 A1 | 5/2019 |
| WO | 2019093922 A1 | 5/2019 |

OTHER PUBLICATIONS

Chen J et al, "Algorithm description of Joint Exploration Test Model 7 (JEM7)", Joint Video Exploration Team (JVET) of ITU-T SG 16 WP 3 and ISO/IEC JTC 1/SC 29/WG 11 , No. JVET-G1001-v1, 7th Meeting: Torino, IT, Jul. 13-21, 2017, XP030150980, total 51 pages.

Ugur K., et al., Motion Compensated Prediction and Interpolation Filter Design in H.265/HEVC, IEEE J. Sel. Top. Sig. Processing 7(6), 946-956 (2013).

H. Lv et al., A Comparison of Fractional-Pel Interpolation Filters in HEVC and H.264/AVC , Visual Communications and Image Processing, 2012. total 6 pages.

ITU-T H.265(Feb. 2018), Series H: Audiovisual and Multimedia Systems Infrastructure of audiovisual services—Coding of moving video, High efficiency video coding, Feb. 2018. total 692 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

* cited by examiner

IMAGE PROCESSING APPARATUS AND METHOD

CROSS-REFERENCE TO RELATED APPLICATIONS

This application is a continuation of International Application No. PCT/RU2018/000207, filed on Mar. 29, 2018, the disclosure of which is hereby incorporated by reference in its entirety.

TECHNICAL FIELD

Generally, the disclosure relates to the field of image processing, in particular video coding. More specifically, the disclosure relates to an image processing apparatus and method for interpolating pixel values of sub-integer pixels on the basis of the pixel values of an array of full-integer pixels as well as an inter-prediction apparatus for video coding including such an image processing apparatus.

BACKGROUND

The interpolation of a digital image, i.e. predicting pixel values of sub-integer pixels on the basis of the pixel values of a two-dimensional array of full-integer pixels, is a common tool in many image-processing applications, such as image resizing or inter-prediction for video coding.

In the field of video coding, for instance, sub-integer pixel interpolation techniques have been developed for improving the prediction accuracy for a level of compression that can be achieved for inter prediction. In this case, the predictive data generated during motion compensation, which is used to code a video block, may correspond to sub-integer pixels, whose values may be interpolated from values for full pixels of video blocks of a reference video frame or other coded unit to which a motion vector refers. The video encoder may calculate values for sub-integer pixel positions using interpolation techniques, e.g., by applying interpolation filters to a set of support pixels, e.g., values for full integer pixels.

Today's standards H.264/AVC and H.265/HEVC are based on a ¼ pel displacement resolution. The Joint Video Exploration Team (JVET) group is exploring post-HEVC video compression technologies, including non-translational motion compensation models, such as affine transforms. In order to estimate and compensate the fractional-pel (or sub-integer) displacements, the full-integer pixels of the reference image have to be interpolated on the fractional-pel, i.e. sub-integer positions. To get the interpolated image on the fractional-pel positions interpolation filters are used. The problem of interpolation for non-translation motion models is the variable fractional-pel displacements.

The quality of the interpolated image strongly depends on the properties of the interpolation filter(s). Short-tap filters (e.g. bilinear) may suppress high frequencies and make interpolated picture blurred. On the other hand, long-tap filters (e.g. sinc-based) require more memory bandwidth and may preserve high frequencies but generate some ringing artifacts in the vicinity of sharp edges. Another consideration is that for motion compensation of non-translational models the complexity has been reduced by decreasing of accuracy of interpolation and prediction.

In the proposed JEM affine motion model there are two types of motion supported: zoom and rotation. Most of the fractional-pel positions are non-constant within a prediction unit. Pixels are replaced by sub-blocks to speed up the interpolation. Within one sub-block the displacement vector is constant and translational. The complexity was reduced gradually but accuracy was reduced as well. To improve the quality of prediction the precision of motion compensation was improved by increasing the precision of motion vector displacement for sub-blocks with increasing of amount of interpolation filters. Current accuracy of interpolation filtering for non-translational motion model still requires to be improved.

Conventionally, bi-linear interpolation is used in many image processing applications, including intra-prediction for video coding. The key idea behind bi-linear interpolation is to perform linear interpolation first in one direction and the again in the other direction. FIG. 1 illustrates an example of conventional bi-linear interpolation. In a first stage the pixel values of the pixels 1a, 1c and the pixel values of the pixels 1b, 1d are interpolated in the y-direction to obtain the interpolated values at the sub-integer pixels 1ac and 1bd, respectively. In a second stage the interpolated values of the sub-integer pixels 1ac and 1bd are interpolated in the x-direction to obtain the interpolated pixel value for the desired sub-integer pixel 2. In the example shown in FIG. 1 a plurality of desired sub-integer pixels, including the sub-integer pixel 2 are located along a straight line 3. For such scenarios it would be desirable to have an interpolation scheme capable of providing better interpolation results than conventional bi-linear interpolation.

Thus, there is a need for an improved image processing apparatus and method implementing an improved interpolation scheme, in particular for inter prediction for video coding.

SUMMARY

It is an object of the disclosure to provide an improved image processing apparatus and method implementing an improved interpolation scheme, in particular for inter prediction for video coding.

The foregoing and other objects are achieved by the subject matter of the independent claims. Further implementation forms are apparent from the dependent claims, the description and the figures.

According to a first aspect, the disclosure relates to an image processing apparatus for determining on the basis of an image defining a plurality of pixel values of an array of pixels an interpolated pixel value of a target pixel. The image processing apparatus comprises processing circuitry configured to: obtain a direction angle value associated with the target pixel; select for the target pixel a plurality of primary interpolation support pixels from the array of pixels on the basis of the position of the target pixel; determine pixel values of a first and a second secondary interpolation support pixels on the basis of the pixel values of the selected primary interpolation support pixels, the direction angle value and the position of the target pixel; and determine the interpolated pixel value of the target pixel on the basis of the pixel values of the first and the second secondary interpolation support pixels and the position of the target pixel. In an implementation form, the array of pixels is an array of full-integer pixels. In an implementation form, the target pixel is a sub-integer pixel.

In a further possible implementation form of the first aspect, the plurality of primary interpolation support pixels of the target pixel includes one or more primary interpolation support pixels of a previously interpolated target pixel and/or the plurality of secondary interpolation support pixels includes one or more secondary interpolation support pixels of a previously interpolated target pixel.

In a further possible implementation form of the first aspect, the array of pixels defines a horizontal direction and a vertical direction, wherein the direction angle value is the acute angle between a straight line passing through the target pixel and the horizontal direction.

In a further possible implementation form of the first aspect, the processing circuitry is configured to obtain the direction angle value by determining the direction angle value as the angle between the horizontal direction and the straight line passing through the target pixel and connecting the target pixel with a further target pixel to be interpolated.

In a further possible implementation form of the first aspect, the direction angle value lies in the range from 0° to 45°, wherein the position of the first secondary interpolation support pixel is defined by the intersection point between a straight line passing through the target pixel with the direction angle value and a first vertical line connecting two of the plurality of primary interpolation support pixels and wherein the position of the second secondary interpolation support pixel is defined by the intersection point between the straight line passing through the target pixel with the direction angle value and a second vertical line connecting two other of the plurality of primary interpolation support pixels.

In a further possible implementation form of the first aspect, the processing circuitry is configured to determine the pixel value of the first secondary interpolation support pixel as a weighted sum of the two of the plurality of primary interpolation support pixels, wherein the weighted sum depends on the respective vertical distances between each of the two of the plurality of primary interpolation support pixels and the first secondary interpolation support pixel, and to determine the pixel value of the second secondary interpolation support pixel as a weighted sum of the two other of the plurality of primary interpolation support pixels, wherein the weighted sum depends on the respective vertical distances between each of the two other of the plurality of primary interpolation support pixels and the second secondary interpolation support pixel.

In a further possible implementation form of the first aspect, the processing circuitry is configured to determine the interpolated pixel value of the target pixel as a weighted sum of the pixel values of the first and the second secondary interpolation support pixels, wherein the weighted sum depends on the horizontal distance between the position of the first secondary interpolation support pixel and the position of the target pixel and on the horizontal distance between the position of the second secondary interpolation support pixel and the position of the target pixel.

In a further possible implementation form of the first aspect, the direction angle value lies in the range from 45° to 90°, wherein the position of the first secondary interpolation support pixel is defined by the intersection point between a straight line passing through the target pixel with the direction angle value and a first horizontal line connecting two of the plurality of primary interpolation support pixels and wherein the position of the second secondary interpolation support pixel is defined by the intersection point between the straight line passing through the target pixel with the direction angle value and a second horizontal line connecting two other of the plurality of primary interpolation support pixels.

In a further possible implementation form of the first aspect, the processing circuitry is configured to determine the pixel value of the first secondary interpolation support pixel as a weighted sum of the two of the plurality of primary interpolation support pixels, wherein the weighted sum depends on the respective horizontal distances between each of the two of the plurality of primary interpolation support pixels and the first secondary interpolation support pixel, and to determine the pixel value of the second secondary interpolation support pixel as a weighted sum of the two other of the plurality of primary interpolation support pixels, wherein the weighted sum depends on the respective horizontal distances between each of the two other of the plurality of primary interpolation support pixels and the second secondary interpolation support pixel.

In a further possible implementation form of the first aspect, the processing circuitry is configured to determine the interpolated pixel value of the target pixel as a weighted sum of the pixel values of the first and the second secondary interpolation support pixels, wherein the weighted sum depends on the vertical distance between the position of the first secondary interpolation support pixel and the position of the target pixel and on the vertical distance between the position of the second secondary interpolation support pixel and the position of the target pixel.

In a further possible implementation form of the first aspect, the position of the target pixel defines a current grid cell of the array of pixels, wherein the plurality of primary interpolation support pixels comprise one or more pixels from the array of pixels located at one or more corners of the current grid cell of the array of pixels.

In a further possible implementation form of the first aspect, the plurality of primary interpolation support pixels further comprise one or more pixels from the array of pixels located at one or more corners of a further grid cell, in particular a neighbouring grid cell of the current grid cell.

According to a second aspect the disclosure relates to a corresponding image processing method for determining on the basis of an image defining a plurality of pixel values of an array of pixels an interpolated pixel value of a target pixel. The method comprises: obtaining a direction angle value associated with the target pixel; selecting for the target pixel a plurality of primary interpolation support pixels from the array of pixels on the basis of the direction angle value and the position of the target pixel; determining pixel values of a first and a second secondary interpolation support pixels on the basis of the pixel values of the selected primary interpolation support pixels, the direction angle value and the position of the target pixel; and determining the interpolated pixel value of the target pixel on the basis of the pixel values of the plurality of secondary interpolation support pixels and the position of the target pixel, in particular the horizontal or vertical position of the target pixel.

The image processing method according to the second aspect of the disclosure can be performed by the image processing apparatus according to the first aspect of the disclosure. Further features of the image processing method according to the second aspect of the disclosure result directly from the functionality of the image processing apparatus according to the first aspect of the disclosure and its different implementation forms described above and below.

According to a third aspect the disclosure relates to an apparatus for inter prediction of a pixel value of a current full-integer pixel of a plurality of pixels of a current block of a current frame of a video signal. The apparatus comprises the image processing apparatus according to the first aspect and a processing unit. The processing unit is configured to: determine a motion vector of the current full-integer pixel on the basis of the current frame and a reference frame of the video signal and/or a motion compensation model; determine for the current full-integer pixel a corresponding sub-integer pixel in the reference frame on the basis of the motion vector of the current full-integer pixel; and generate on the basis of a predefined set of filter support pixels in the current frame a set of corresponding filter support pixels in the reference frame, wherein the predefined set of filter support pixels in the current frame comprises one or more neighboring full-integer pixels and/or sub-integer pixels of the current full-integer pixel. The image processing apparatus is configured to determine a respective pixel value, in particular luminance value, of the corresponding sub-integer pixel of the current full-integer pixel and the corresponding filter support pixels in the reference frame. The processing unit is further configured to determine the inter predicted pixel value of the current pixel in the current frame by applying a spatial high-pass filter to the pixel value of the corresponding sub-integer pixel of the current full-integer pixel in the reference frame and to the pixel values of the corresponding filter support pixels in the reference frame.

In a further possible implementation form of the third aspect, the predefined set of filter support pixels in the current frame comprises one or more vertically and/or horizontally neighboring half-integer pixels of the current full-integer pixel in the current frame.

In a further possible implementation form of the third aspect, the predefined set of filter support pixels in the current frame comprises one or more vertically and/or horizontally neighboring full-integer pixels of the current full-integer pixel in the current frame.

In a further possible implementation form of the third aspect, the spatial high-pass filter is a 5-tap filter or a 3-tap filer. In an implementation form, the 5-tap filter or the 3-tap filter is a symmetric filter, i.e. a filter where the first and the fifth/third filter coefficients are identical and the second and the fourth filter coefficients are identical. In an implementation form, the first and the fifth filter coefficients are negative, while the other filter coefficients of the 5-tap filter are positive.

In a further possible implementation form of the third aspect, the predefined set of filter support pixels in the current frame comprises one or more neighboring full-integer pixels and half-integer pixels of the current full-integer pixel and the 5-tap filter has the following filter coefficients (−6, 9, 26, 9, −6), which can be normalized by the factor $1/32$.

In a further possible implementation form of the third aspect, the predefined set of filter support pixels in the current frame comprises one or more neighboring full-integer pixels and half-integer pixels of the current full-integer pixel and the 5-tap filter has the following filter coefficients (−1, 0, 10, 0, −1), which can be normalized by the factor $1/8$. As will be appreciated, in a further possible implementation form without the intermediate half-integer support pixels, this filter becomes a 3-tap filter with the coefficients (−1, 10, −1).

In a further possible implementation form of the third aspect, the processing unit of the apparatus is further configured to determine a respective motion vector of each of the sub-integer pixels of the filter support pixels in the current frame on the basis of the motion vector of the current full-integer pixel and one or more motion vectors of neighboring full-integer and/or neighboring sub-integer pixels of the current full-integer pixel.

In a further possible implementation form of the third aspect, the processing unit of the apparatus is configured to determine a respective motion vector of each of the sub-integer pixels of the filter support pixels in the current frame by determining a mean vector of the motion vector of the current full-integer pixel and one or more motion vectors of neighboring full-integer pixels of the current full-integer pixel.

In a further possible implementation form of the third aspect, the processing unit of the apparatus is further configured to determine the one or more motion vectors of neighboring full-integer pixels of the current full-integer pixel on the basis of the current frame and the reference frame of the video signal and/or a motion compensation model.

In a further possible implementation form of the third aspect, the processing unit of the apparatus is configured to determine the inter predicted pixel value of the current pixel in the current frame by applying a spatial high-pass filter to the pixel value of the corresponding sub-integer pixel of the current full-integer pixel in the reference frame and to the pixel values of the corresponding filter support pixels in the reference frame, in case the motion vector of the current full-integer pixel is determined on the basis of a non-translational motion compensation model, and to determine the inter predicted pixel value of the current pixel in the current frame on the basis of a conventional scheme, such as the conventional scheme defined in H.264/AVC and H.265/HEVC, in case the motion vector of the current full-integer pixel is determined on the basis of a translational motion compensation model.

In a further possible implementation form of the third aspect, the non-translational motion compensation model is an affine, warping and/or panoramic motion compensation model.

According to a fourth aspect the disclosure relates to an encoding apparatus for encoding a current image of a video signal, wherein the encoding apparatus comprises an inter prediction apparatus according to the third aspect.

According to a fifth aspect the disclosure relates to a decoding apparatus for decoding a current reconstructed image of a compressed video signal, wherein the decoding apparatus comprises an inter prediction apparatus according to the third aspect.

According to a sixth aspect the disclosure relates to a computer program product comprising program code for performing the method according to the second aspect when executed on a computer or a processor.

Embodiments of the disclosure provide in particular for the following advantages. Embodiments of the disclosure allow performing interpolation with pixel-wise accuracy while keeping the complexity at a low level. Embodiments of the disclosure support any kind of non-translational movements. Embodiments of the disclosure allow removing blocking artefacts across sub-blocks edges. Embodiments of the disclosure reduce memory bandwidth. Embodiments of the disclosure reduce memory requirements for storing a set of filter coefficients. Embodiments of the disclosure allow reusing well optimized in HW bilinear transform. Embodiments of the disclosure align orientation of filtering along transformation. Embodiments of the disclosure allow reducing ringing artifacts caused by long motion interpolation filter while improving quality of interpolated edges. Embodiments of the disclosure allow increasing subjective quality of edges in reconstructed pictures. Moreover, embodiments of the disclosure do not require any additional signaling and, thus, can seamlessly replace existing interpolation methods for non-translational movements. Splitting the interpolation into two steps allows separating the fractional offset compensation from the high-pass filtering.

BRIEF DESCRIPTION OF THE DRAWINGS

Further embodiments of the disclosure will be described with respect to the following figures, wherein.

In the various figures, identical reference signs will be used for identical or functionally equivalent features.

DETAILED DESCRIPTION OF THE EMBODIMENTS

In the following description, reference is made to the accompanying drawings, which form part of the disclosure, and in which are shown, by way of illustration, specific aspects in which the disclosure may be placed. It is understood that other aspects may be utilized and structural or logical changes may be made without departing from the scope of the disclosure. The following detailed description, therefore, is not to be taken in a limiting sense, as the scope of the disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 2:
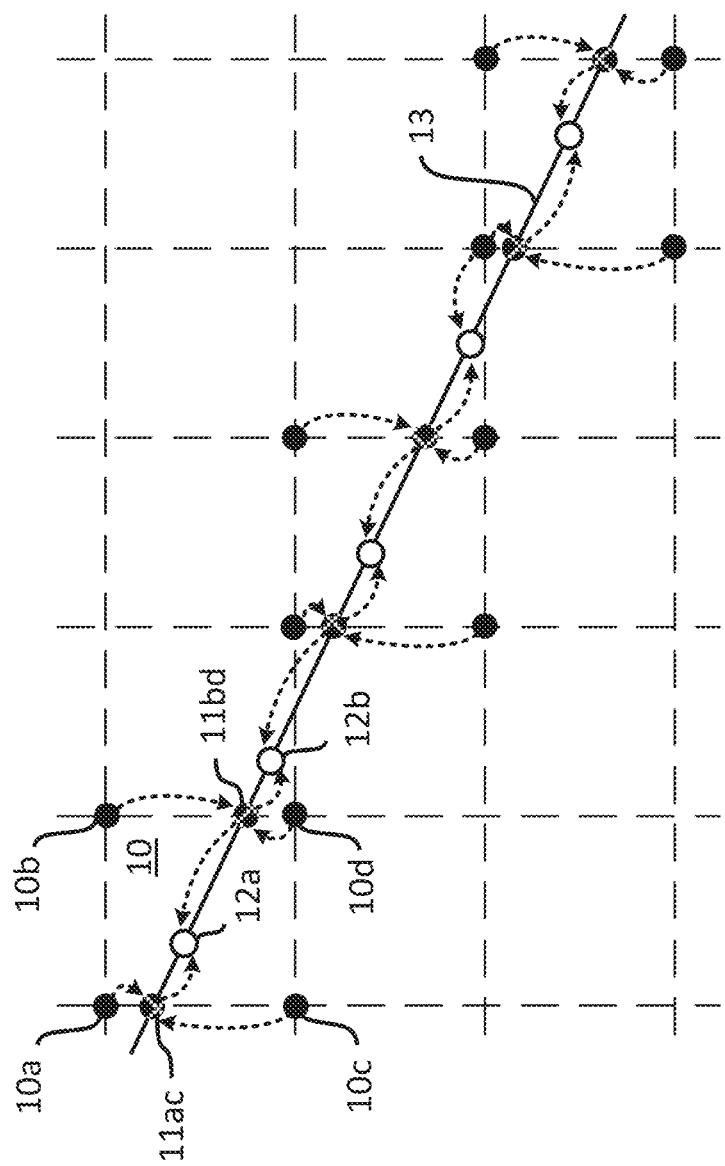
FIG. 2 shows a schematic diagram illustrating a scheme for interpolating pixel values of sub-integer pixels on the basis of the pixel values of an array of full-integer pixels as implemented in an image processing apparatus according to an embodiment.
Figure 3:
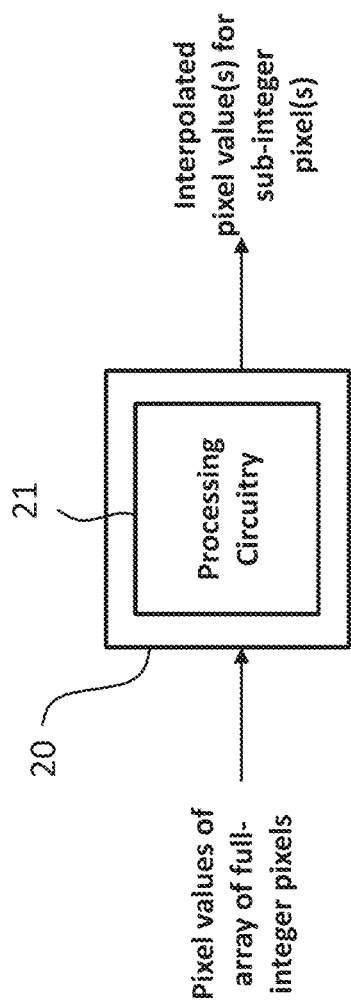
FIG. 3 shows a schematic diagram illustrating an image processing apparatus according to an embodiment for interpolating pixel values of sub-integer pixels on the basis of the pixel values of an array of full-integer pixels.

FIG. 2 shows a schematic diagram illustrating a scheme for interpolating pixel values of target pixels, in particular sub-integer pixels on the basis of the pixel values of an array of pixels, in particular full-integer pixels as implemented in an image processing apparatus according to an embodiment, for instance, the image processing apparatus 20 shown in FIG. 3. The image processing apparatus 20 comprises processing circuitry 21 for determining on the basis of an image defining a plurality of pixel values of an array of pixels, in particular full-integer pixels 10a-d an interpolated pixel value of a target, in particular sub-integer pixel 12a.

As will be described in more detail below, the processing circuitry 21 of the image processing apparatus 20 is configured to: obtain a direction angle value associated with the target, in particular sub-integer pixel 12a (in FIG. 2 the direction angle value is defined by the acute angle between the straight line 13 passing through the target pixel 12a and the horizontal or x-direction); select for the target pixel 12a a plurality of primary interpolation support pixels 10a-d from the array of pixels on the basis of the direction angle value and the position of the sub-integer pixel 12a; determine pixel values of a first and a second secondary interpolation support pixels 11ac, 11bd on the basis of the pixel values of the selected primary interpolation support pixels 10a-d, the direction angle value and the position of the target pixel 12a; and determine the interpolated pixel value of the target pixel 12a on the basis of the pixel values of the first and the second secondary interpolation support pixels 11ac, 11bd and the position of the target pixel 12a, in particular the horizontal or vertical position of the target pixel 12a.

As shown in FIG. 2, the array of pixels defines a horizontal direction and a vertical direction, wherein the direction angle value is the acute angle between the straight line 13 passing through the target pixel 12a and the horizontal direction.

Figure 4:
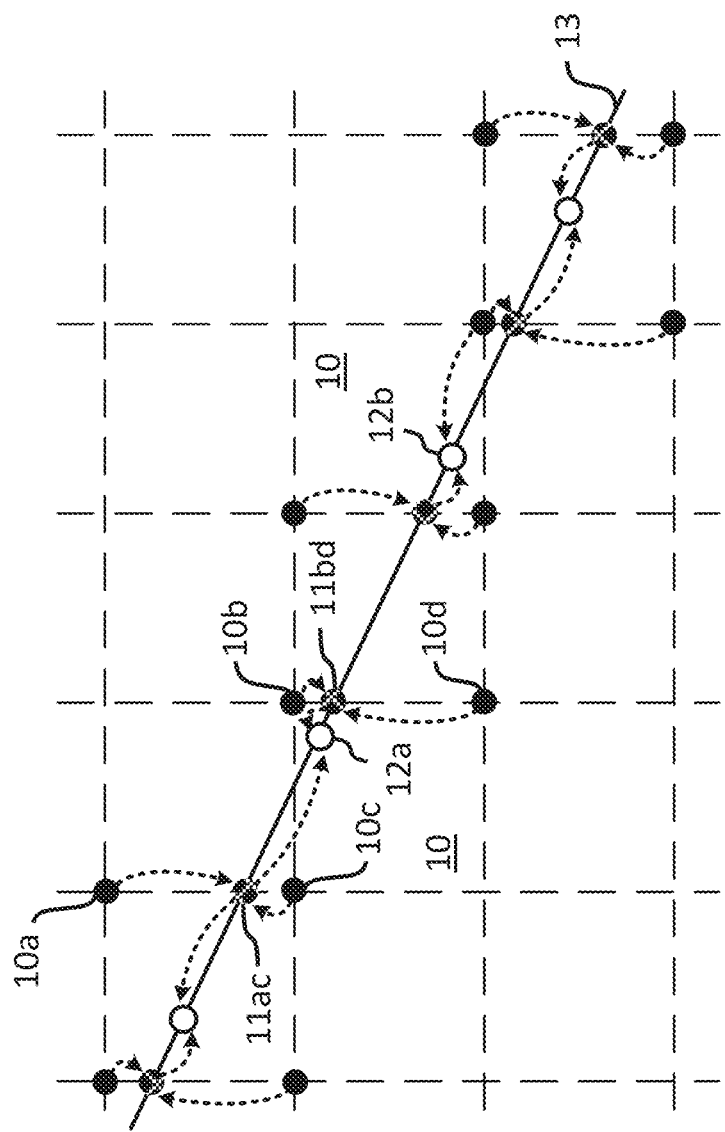
FIG. 4 shows a schematic diagram illustrating a scheme for interpolating pixel values of sub-integer pixels on the basis of the pixel values of an array of full-integer pixels as implemented in an image processing apparatus according to a further embodiment.
Figure 5:
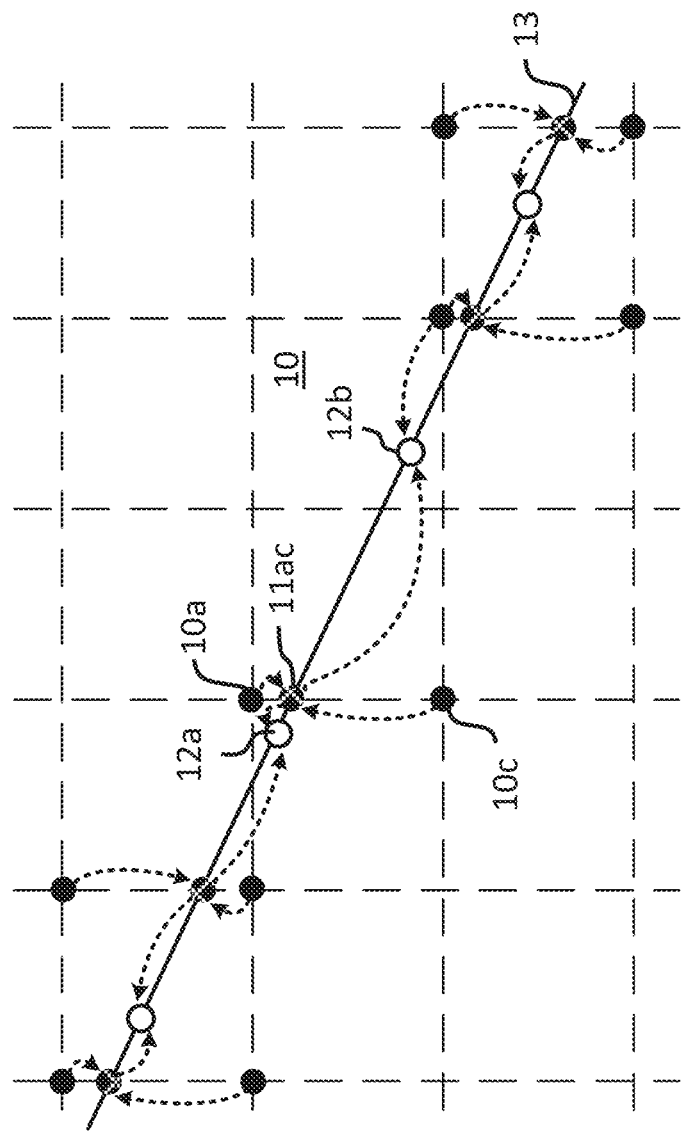
FIG. 5 shows a schematic diagram illustrating a scheme for interpolating pixel values of sub-integer pixels on the basis of the pixel values of an array of full-integer pixels as implemented in an image processing apparatus according to a further embodiment.
Figure 6:
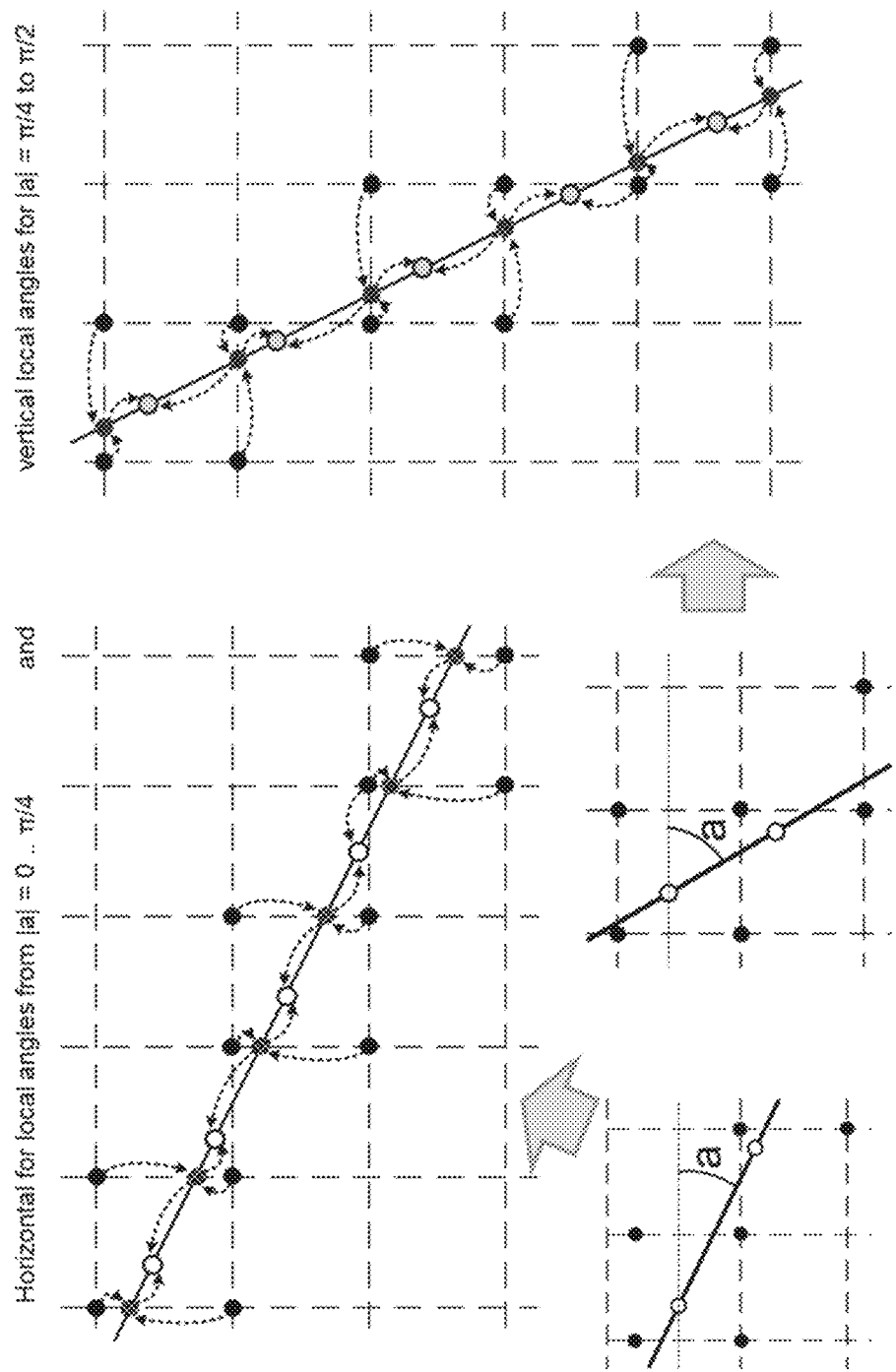
FIG. 6 shows a schematic diagram illustrating a scheme for interpolating pixel values of sub-integer pixels on the basis of the pixel values of an array of full-integer pixels as implemented in an image processing apparatus according to a further embodiment.

Under further reference to FIGS. 4 to 6, in an embodiment, the direction angle value a lies in the range from 0° to 45°. In this case the position of the first secondary interpolation support pixel 11ac is defined by the intersection point between the straight line 13 passing through the target pixel 12 with the direction angle value and a first vertical line connecting the primary interpolation support pixels 10a and 10c. The position of the second secondary interpolation support pixel 11bd is defined by the intersection point between the straight line 13 passing through the target pixel 12 with the direction angle value and a second vertical line connecting the other two primary interpolation support pixels 10b and 10d.

In an embodiment, the processing circuitry 21 of the image processing apparatus 20 is configured to determine the pixel value of the first secondary interpolation support pixel 11ac as a weighted sum of the pixel values of the two primary interpolation support pixels 10a and 10c, wherein the weighted sum depends on the respective vertical distances between each of the two primary interpolation support pixels 10a and 10c and the first secondary interpolation support pixel 11ac. Moreover, the processing circuitry 21 of the image processing apparatus 20 is configured to determine the pixel value of the second secondary interpolation support pixel 11bd as a weighted sum of the other two primary interpolation support pixels 10b and 10d, wherein the weighted sum depends on the respective vertical distances between each of the other two primary interpolation support pixels 10b and 10d and the second secondary interpolation support pixel 11bd.

In an embodiment, the processing circuitry 21 of the image processing apparatus 20 is configured to determine the interpolated pixel value of the target pixel 12 as a weighted sum of the pixel values of the first and the second secondary interpolation support pixels 11ac and 11bd, wherein the weighted sum depends on the horizontal distance between the position of the first secondary interpolation support pixel 11ac and the position of the target pixel 12 (i.e. the smallest distance between the position of the target pixel 12 and the first vertical line connecting the primary interpolation support pixels 10a and 10c) and on the horizontal distance between the position of the second secondary interpolation support pixel 11 and the position of the target pixel 12 (i.e. the smallest distance between the position of the target pixel 12 and the second vertical line connecting the primary interpolation support pixels 10b and 10d).

Figure 10:
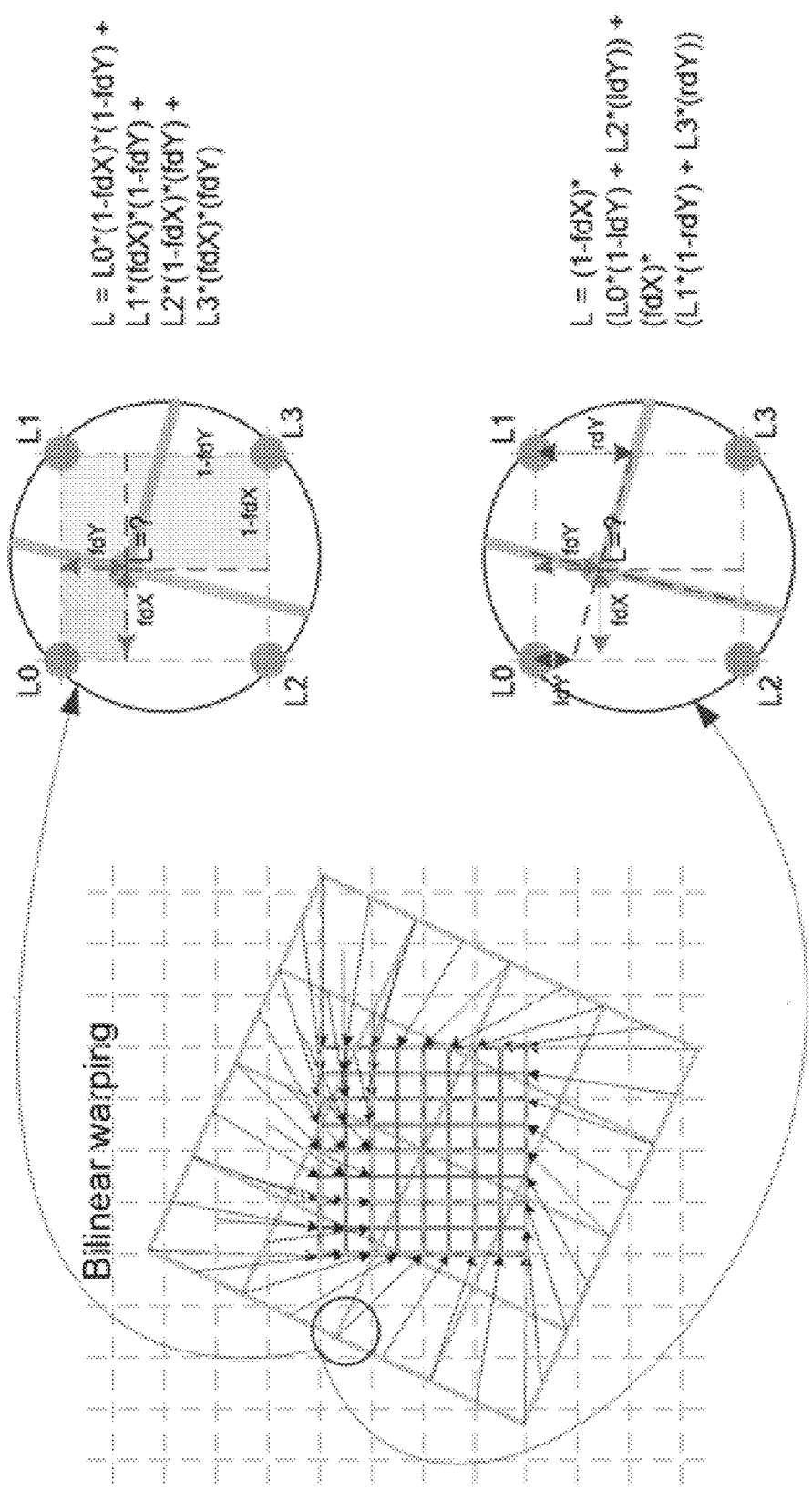
FIG. 10 shows a schematic diagram illustrating an aspect of an interpolation process implemented in an inter prediction apparatus according to an embodiment.

Under reference to FIG. 2 and further reference to FIG. 10, in an embodiment the processing circuitry 21 of the image processing apparatus can be configured to determine the interpolated pixel value L of the target pixel 12 on the basis of the following equation:

$$L=(1-fdX)*(L0*(1-ldY)+L2*(ldY)+(fdX)*(L1*(1-rdY)+L3*(rdY)),$$

wherein, as can be taken from FIG. 10, fdx denotes the normalized horizontal distance between the position of the target pixel 12, L0, L1, L2 and L3 denote the respective pixel values of the primary interpolation support pixels 10a, 10b, 10c and 10d, ldY denotes the normalized vertical distance between the first secondary interpolation support pixel 11ac and the primary interpolation support pixel 10a and rdY denotes the normalized vertical distance between the second secondary interpolation support pixel 11bd and the primary interpolation support pixel 10b.

As can be taken from FIG. 6, for cases, where the direction angle value lies in the range from 45° to 90°, the position of the first secondary interpolation support pixel is defined by the intersection point between the straight line 13 passing through the target pixel 12 with the direction angle value and a first horizontal line connecting two of the plurality of primary interpolation support pixels. Likewise, the position of the second secondary interpolation support pixel is defined by the intersection point between the straight line 13 passing through the target pixel 12 with the direction angle value and a second horizontal line connecting two other of the plurality of primary interpolation support pixels.

In an embodiment, the processing circuitry 21 is configured to determine the pixel value of the first secondary interpolation support pixel as a weighted sum of the pixel values of two of the plurality of primary interpolation support pixels 10a and 10b, wherein the weighted sum depends on the respective horizontal distances between each of the two primary interpolation support pixels 10a and 10b and the first secondary interpolation support pixel, and to determine the pixel value of the second secondary interpolation support pixel as a weighted sum of the other two primary interpolation support pixels 10c and 10d, wherein the weighted sum depends on the respective horizontal distances between each of the other two primary interpolation support pixels 10c and 10d and the second secondary interpolation support pixel.

In an embodiment, the processing circuitry 21 of the image processing apparatus 20 is configured to determine the interpolated pixel value of the target pixel 12 as a weighted sum of the pixel values of the first and the second secondary interpolation support pixels, wherein the weighted sum depends on the vertical distance between the position of the first secondary interpolation support pixel and the position of the target pixel 12 and on the vertical distance between the position of the second secondary interpolation support pixel and the position of the target pixel 12. As will be appreciated by the person skilled in the art, any distances, e.g. horizontal and/or vertical distances, mentioned herein can be normalized distances.

As can be taken from FIGS. 2 and 4, for instance, the position of the current target pixel 12 defines a current cell 10 of the array of pixels, wherein the plurality of primary interpolation support pixels 10a-d selected by the processing circuitry 21 comprise one or more pixels from the array of pixels located at one or more corners of the current cell 10 of the array of pixels. For instance, for the current target pixel 12a shown in FIG. 2, the plurality of primary interpolation support pixels 10a-d selected by the processing circuitry 21 comprise the four corner pixels 10a, 10b, 10c and 10d of the current cell 10 of the array of full-integer pixels.

In a further embodiment, the plurality of primary interpolation support pixels can further comprise one or more pixels from the array of pixels located at one or more corners of a further cell, in particular a neighbouring cell of the current cell. For instance, for the current target pixel 12b shown in FIG. 2, the plurality of primary interpolation support pixels selected by the processing circuitry 21 comprise some of the corner pixels of the current cell as well as some of the corner pixels of neighbouring cells. Likewise, for the current target pixel 12b shown in FIG. 5, the plurality of primary interpolation support pixels selected by the processing circuitry 21 comprise some of the corner pixels of the current cell as well as some of the corner pixels of neighbouring cells, e.g. the pixels 10a and 10c, which can have been used by the processing circuitry 21 to determine the pixel value of the pixel 12a interpolated in a previous processing step. Generally, the processing circuitry 21 of the image processing apparatus 20 is configured to select four primary interpolation support pixels for the current target pixel 12 on the basis of the position thereof.

In a further embodiment, one or more of the primary interpolation support pixels 10a-d of the target pixel 12a-c can be the primary interpolation support pixel(s) 10a-d of a previously interpolated target pixel and/or one or more of the secondary interpolation support pixels 11ac, 11bd can be the secondary interpolation support pixel(s) 11ac, 11bd of a previously interpolated target pixel. For instance, in the embodiment shown in FIG. 5, the secondary interpolation support pixel 11ac of the previously interpolated target pixel 12a is also a secondary interpolation support pixel of the currently interpolated target pixel 12b. Likewise, the primary interpolation support pixels 10a, 10c of the previously interpolated target pixel 12a are also primary interpolation support pixels of the currently interpolated target pixel 2b.

Figure 7:
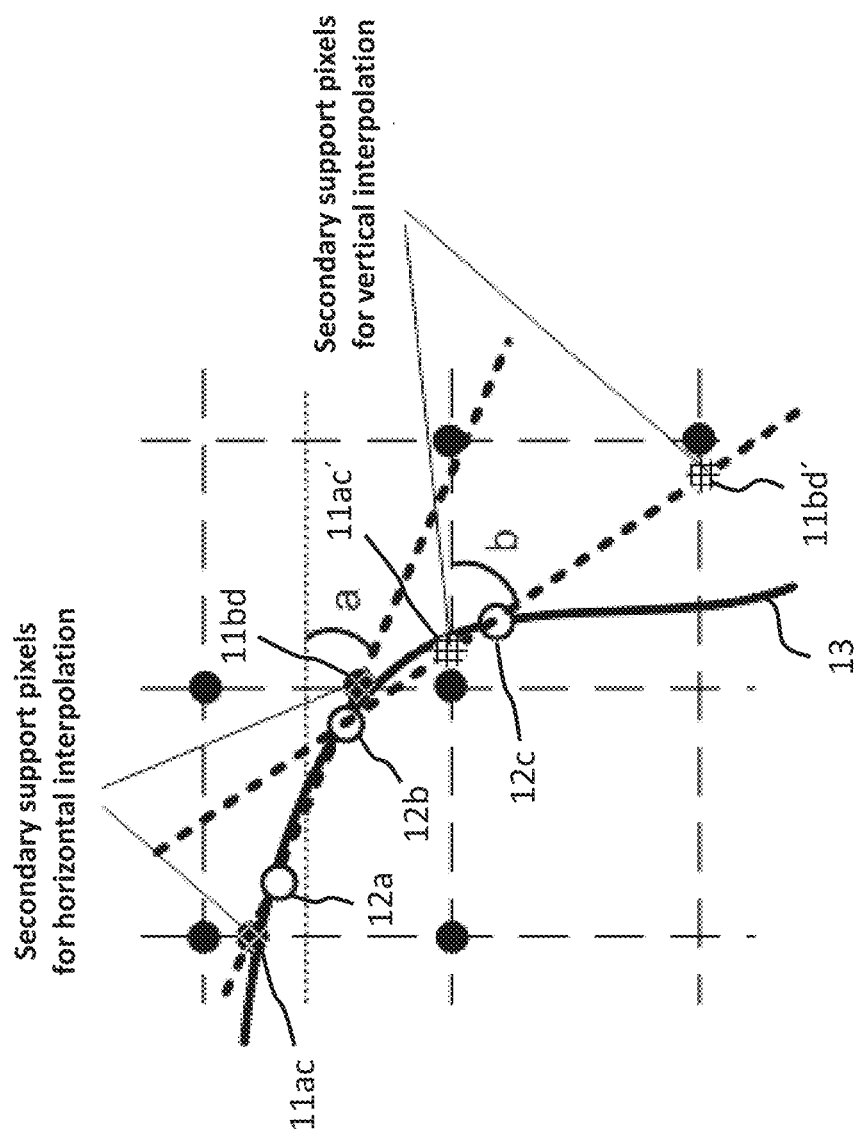
FIG. 7 shows a schematic diagram illustrating a scheme for interpolating pixel values of sub-integer pixels on the basis of the pixel values of an array of full-integer pixels as implemented in an image processing apparatus according to a further embodiment.

As can be gathered from FIG. 7, in an embodiment, the processing circuitry 21 of the image processing apparatus 20 is configured to obtain the direction angle value by determining the direction angle value as the angle defined by a straight line connecting the target pixel with a further target pixel to be interpolated and the horizontal direction (or alternatively the vertical direction). The further target pixel may be a previous or subsequent target pixel to be interpolated. For instance, in the embodiment shown in FIG. 7, the processing circuitry 21 is configured to obtain the direction angle value associated with the target pixel 12a by determining the direction angle value as the angle defined by the straight line connecting the target pixel 12a with the further target pixel 12b, i.e. the acute angle between the straight line connecting the target pixel 12a with the further target pixel 12b and the horizontal direction. Likewise, the processing circuitry 21 is configured to obtain the direction angle value b associated with the target pixel 12b by determining the direction angle value b as the angle defined by the straight line connecting the target pixel 12b with the further target pixel 12c, i.e. the acute angle between the straight line connecting the target pixel 12b with the further target pixel 12c and the horizontal direction.

Figure 8:
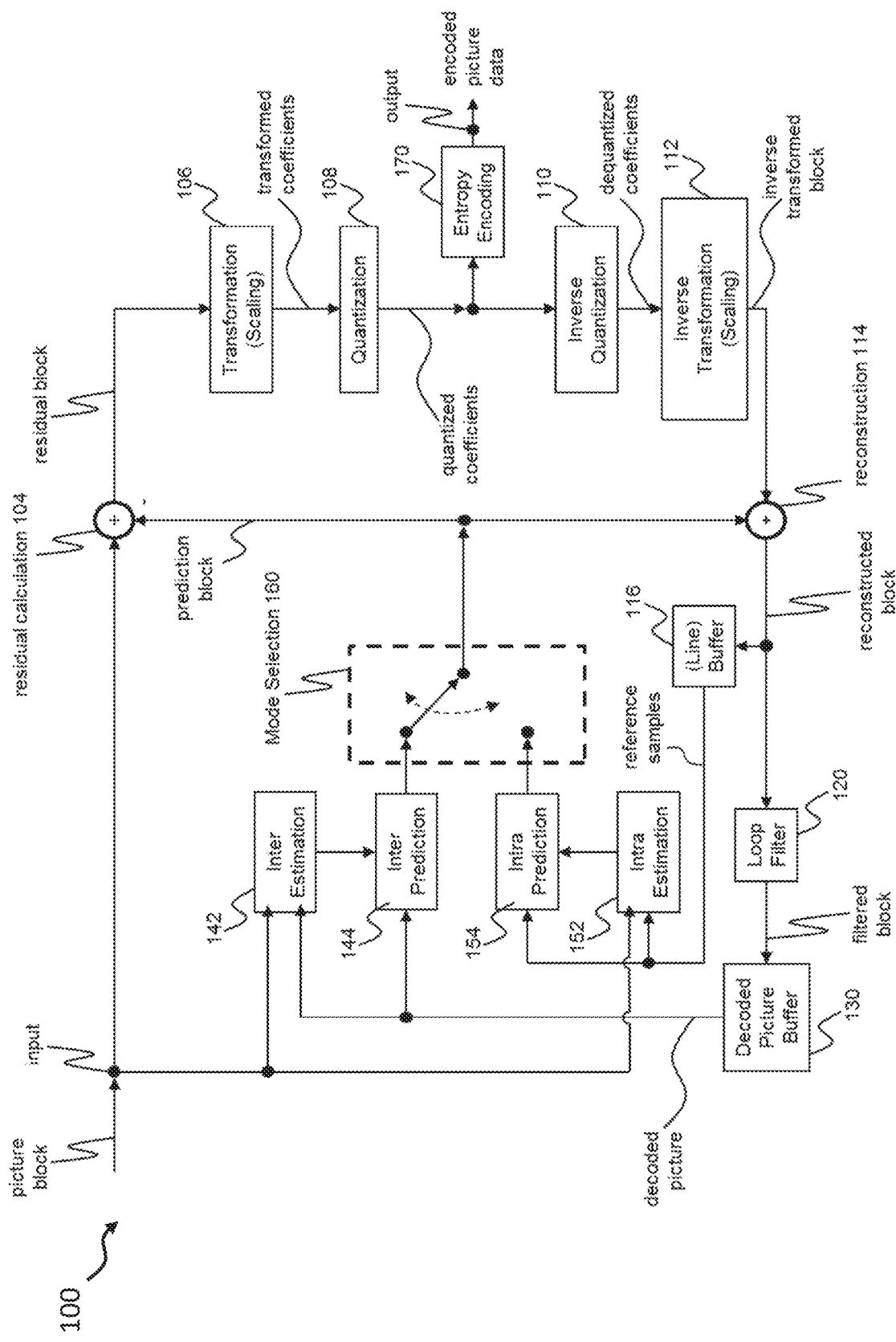
FIG. 8 shows a schematic diagram illustrating an encoding apparatus according to an embodiment comprising an inter prediction apparatus according to an embodiment.

FIG. 8 shows an encoding apparatus 100 according to an embodiment comprising an inter prediction apparatus 144 according to an embodiment with the image processing apparatus 20 according to any one of the embodiments described above. The encoding apparatus 100 is configured to encode a block of a frame of a video signal comprising a plurality of frames (also referred to as pictures or images herein), wherein each frame is dividable into a plurality of blocks and each block comprises a plurality of pixels. In an embodiment, the blocks could be macro blocks, coding tree units, coding units, prediction units and/or prediction blocks.

Figure 1:
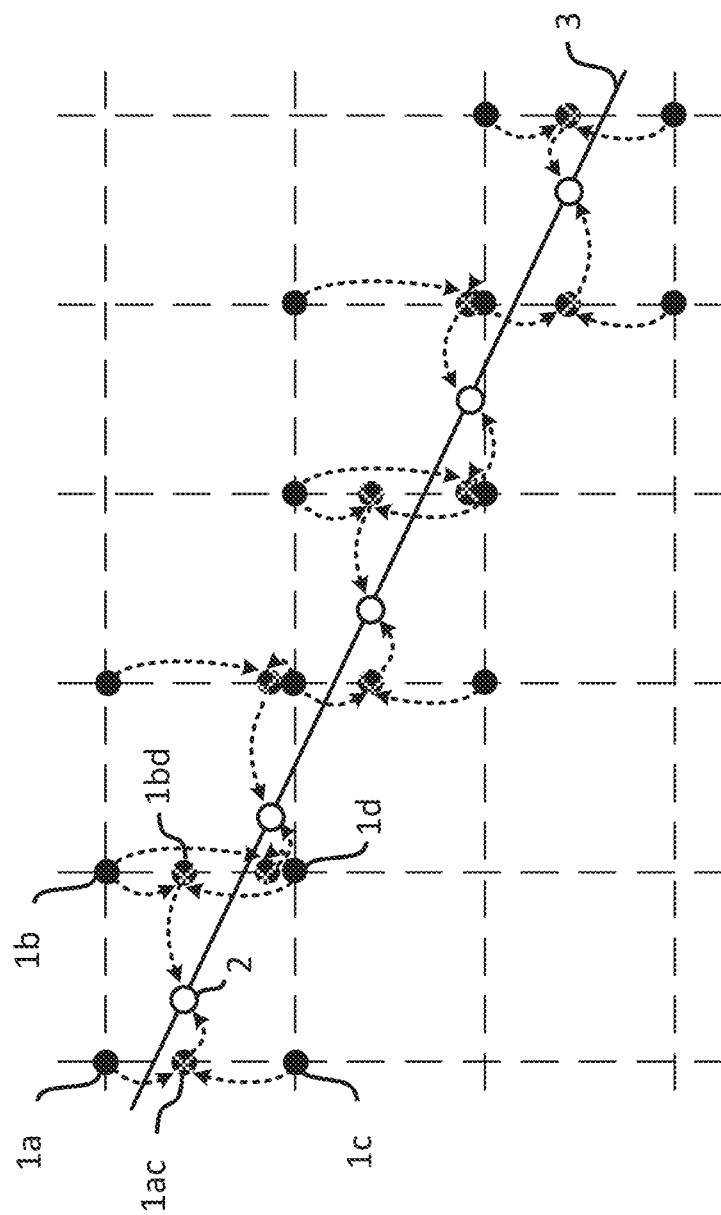
FIG. 1 shows a schematic diagram illustrating conventional bi-linear interpolation of pixel values of sub-integer pixels on the basis of the pixel values of an array of full-integer pixels.

In the exemplary embodiment shown in FIG. 1, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 2 further comprises an intra prediction unit 154 for intra prediction. An intra frame can be decoded without information from other frames. The intra prediction unit 154 can perform the intra prediction of a block on the basis of information provided by the intra estimation unit 152.

The blocks of subsequent frames following the first intra frame can be coded using inter or intra prediction, as selected by a mode selection unit 160. Generally, the inter prediction unit 144 can be configured to perform motion compensation of a block based on motion estimation, as will be described in more detail further below. In an embodiment, the motion estimation can be performed by an inter estimation unit 142 of the encoding apparatus. However, in other embodiments, the functionality of the inter estimation unit 142 can be implemented as part of the inter prediction unit 144 as well.

Furthermore, in the hybrid encoder embodiment shown in FIG. 1 a residual calculation unit 104 determines the difference between the original block and its prediction, i.e. the residual block defining the prediction error of the intra/inter picture prediction. This residual block is transformed by the transformation unit 106 (for instance using a DCT) and the transformation coefficients are quantized by the quantization unit 108. The output of the quantization unit 108 as well as the coding or side information provided, for instance, by the inter prediction unit 144 are further encoded by an entropy encoding unit 170.

A hybrid video encoder, such as the encoding apparatus 100 shown in FIG. 8, usually duplicates the decoder processing such that both will generate the same predictions. Thus, in the embodiment shown in FIG. 8 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by an in-loop filter 120 for removing image artifacts. The final picture is stored in a decoded picture buffer 130 and can be used as a reference frame for the inter prediction of subsequent frames.

Figure 9:
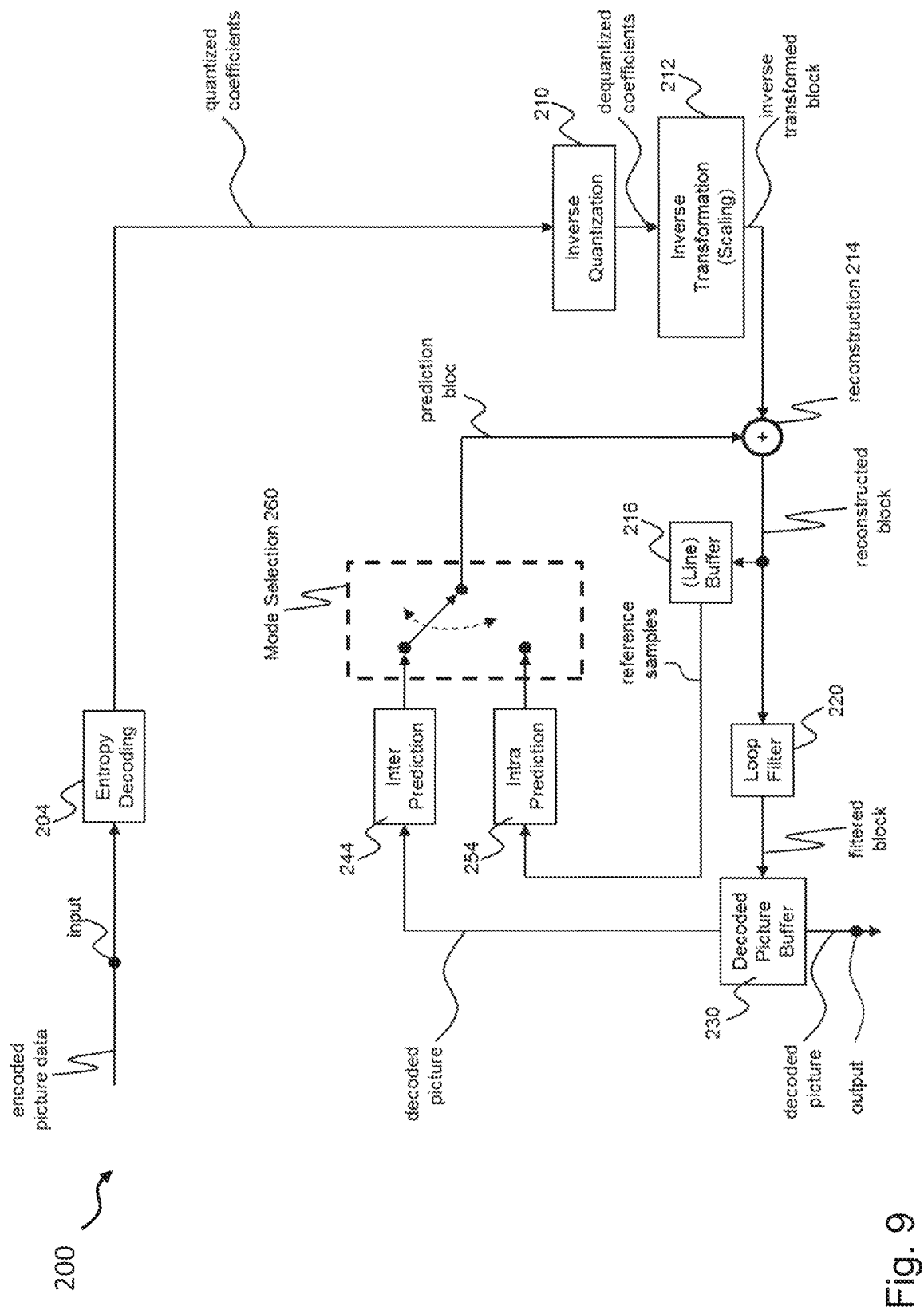
FIG. 9 shows a schematic diagram illustrating a decoding apparatus according to an embodiment comprising an inter prediction apparatus according to an embodiment.

FIG. 9 shows a decoding apparatus 200 according to an embodiment comprising an inter prediction apparatus 244 according to an embodiment with the image processing apparatus 20 according to any one of the embodiments described above. The decoding apparatus 200 is configured to decode a block of a frame of an encoded video signal. In the embodiment shown in FIG. 9 the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for the inter prediction apparatus 244 and an intra prediction unit 254 as well as other components of the decoding apparatus 200. In the embodiment shown in FIG. 9, the inter prediction apparatus 244 or the intra prediction unit 254 of the decoding apparatus 200 shown in FIG. 2 are selected by a mode selection unit 260 and function in the same way as the inter prediction apparatus 144 and the intra prediction unit 154 of the encoding apparatus 100 shown in FIG. 1, so that identical predictions can be generated by the encoding apparatus 100 and the decoding apparatus 200. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the in-loop filter 220 for future inter predictions.

The apparatus 144, 244 is configured to perform an inter prediction of a pixel value of a current full-integer pixel of a plurality of pixels of a current block of a current frame of a video signal. The apparatus 144, 244 comprises the image processing apparatus 20 according to any one of the embodiments described above and a processing unit, which can be implemented in software and/or hardware. In an embodiment, the image processing apparatus 20 can be implemented by the processing unit of the apparatus 144, 244. In another embodiment, the image processing apparatus 20 and the processing unit of the apparatus 144, 244 are different physical entities.

The processing unit of the apparatus 144, 244 is configured to determine a motion vector of the current full-integer pixel. In an embodiment, the processing unit of the apparatus 144, 244 is configured to determine the motion vector of the current full-integer pixel on the basis of the current frame and a reference frame of the video signal by determining the position of the pixel in the reference frame corresponding to the current full-integer pixel in the current frame. In an embodiment, the processing unit of the apparatus 144, 244 is configured to determine the motion vector of the current full-integer pixel on the basis of an adopted motion compensation model. For instance, in the case of a translational or affine motion compensation model the motion vector of the current full-integer pixel can be determined using one or more motion vectors of pixels of the same block the current full-integer pixel belongs to. As used herein, "motion compensation model" is also referred to as motion transformational model, motion model description and the like.

The processing unit of the apparatus 144, 244 is further configured to determine for the current full-integer pixel the corresponding sub-integer pixel in the reference frame on the basis of the motion vector of the current full-integer pixel.

The processing unit of the apparatus 144, 244 is further configured to generate on the basis of a predefined set of filter support pixels in the current frame a set of corresponding filter support pixels in the reference frame. The predefined set of filter support pixels in the current frame comprises one or more neighboring full-integer pixels and/or sub-integer pixels of the current full-integer pixel.

In an embodiment, the predefined set of filter support pixels in the current frame comprises one or more vertically and/or horizontally neighboring half-integer pixels of the current full-integer pixel in the current frame. For instance, in an embodiment the predefined set of filter support pixels in the current frame comprises the neighboring half-integer pixels above, to the left of, below and to the right of the current full-integer pixel.

In an embodiment, the predefined set of filter support pixels in the current frame comprises one or more vertically and/or horizontally neighboring full-integer pixels of the current full-integer pixel in the current frame. For instance, in an embodiment the predefined set of filter support pixels in the current frame comprises the neighboring full-integer pixels above, to the left of, below and to the right of the current full-integer pixel. In an embodiment, the predefined set of filter support pixels in the current frame can comprise the neighboring half-integer and/or full-integer pixels above, to the left of, below and to the right of the current full-integer pixel in the current frame.

The image processing apparatus 20 of the apparatus 144, 244 is configured to determine the respective pixel values of the corresponding sub-integer pixel of the current full-integer pixel in the reference frame and of the corresponding filter support pixels in the reference frame on the basis of an interpolation of the respective neighboring full-integer pixels in the reference frame based on one of the interpolation schemes described above. FIG. 10 illustrates an example of using conventional bilinear interpolation or one of the interpolation schemes described above, as implemented in the image processing apparatus 20 according to an embodiment, for determining the pixel value of the corresponding sub-integer pixel of the current full-integer pixel in the reference frame. In FIG. 10, a reference block in the reference frame is enlarged and rotated relative to a current block comprising an exemplary current pixel of the current frame. Moreover, FIG. 10 illustrated the increased resolution used for the filter support pixels.

The processing unit of the apparatus 144, 244 is further configured to determine an inter predicted pixel value of the current pixel in the current frame by applying a spatial high-pass filter to the pixel value of the corresponding sub-integer pixel of the current full-integer pixel in the reference frame and to the pixel values of the corresponding filter support pixels in the reference frame.

In an embodiment, the spatial high-pass filter is a 5-tap filter. In an embodiment, the 5-tap filter is a symmetric filter, i.e. a filter where the first and the fifth filter coefficients are identical and the second and the fourth filter coefficients are identical. In an embodiment, the first and the fifth filter coefficients are negative, while the other filter coefficients of the 5-tap filter are positive. In an embodiment, the spatial high-pass filter can be applied separately in the vertical and the horizontal direction.

In an embodiment, the predefined set of filter support pixels in the current frame comprises five neighboring full-integer pixels and half-integer pixels of the current full-integer pixel and the 5-tap filter has the following filter coefficients (−6, 9, 26, 9, −6) within a given numerical precision, which can be normalized by the factor $\frac{1}{32}$.

In a further embodiment, the predefined set of filter support pixels in the current frame comprises five neighboring full-integer pixels and half-integer pixels of the current full-integer pixel and the 5-tap filter has the following filter coefficients (−1, 0, 10, 0, −1) within a given numerical precision, which can be normalized by the factor $\frac{1}{8}$. As will be appreciated, in an embodiment without the intermediate half-integer support pixels, this filter becomes a 3-tap filter with three full-integer support pixels and with the coefficients (−1, 10, −1).

In an embodiment, the processing unit of the apparatus 144, 244 is configured to determine the inter predicted pixel value of the current pixel in the current frame on the basis of a two-dimensional separable convolution process on the basis of the filter support pixels. For instance, for the case of a 5-tap filter the processing unit of the apparatus 144, 244 is configured to apply the 5-tap filter to each horizontal and vertical line defined by the five horizontally and vertically neighbouring half-integer and full-integer pixels of the current pixel.

In any embodiments, the intermediate rounding or clipping at any step of implementation could be applied in order to keep the fixed number of bits as input range for computational operations. For instance, after any separable step of filtering (like horizontal filtering) intermediate values could be normalized and rounded to 16 bit of precision for using in the following multiplication by filter coefficient of the next step (like vertical filtering).

Figure 11:
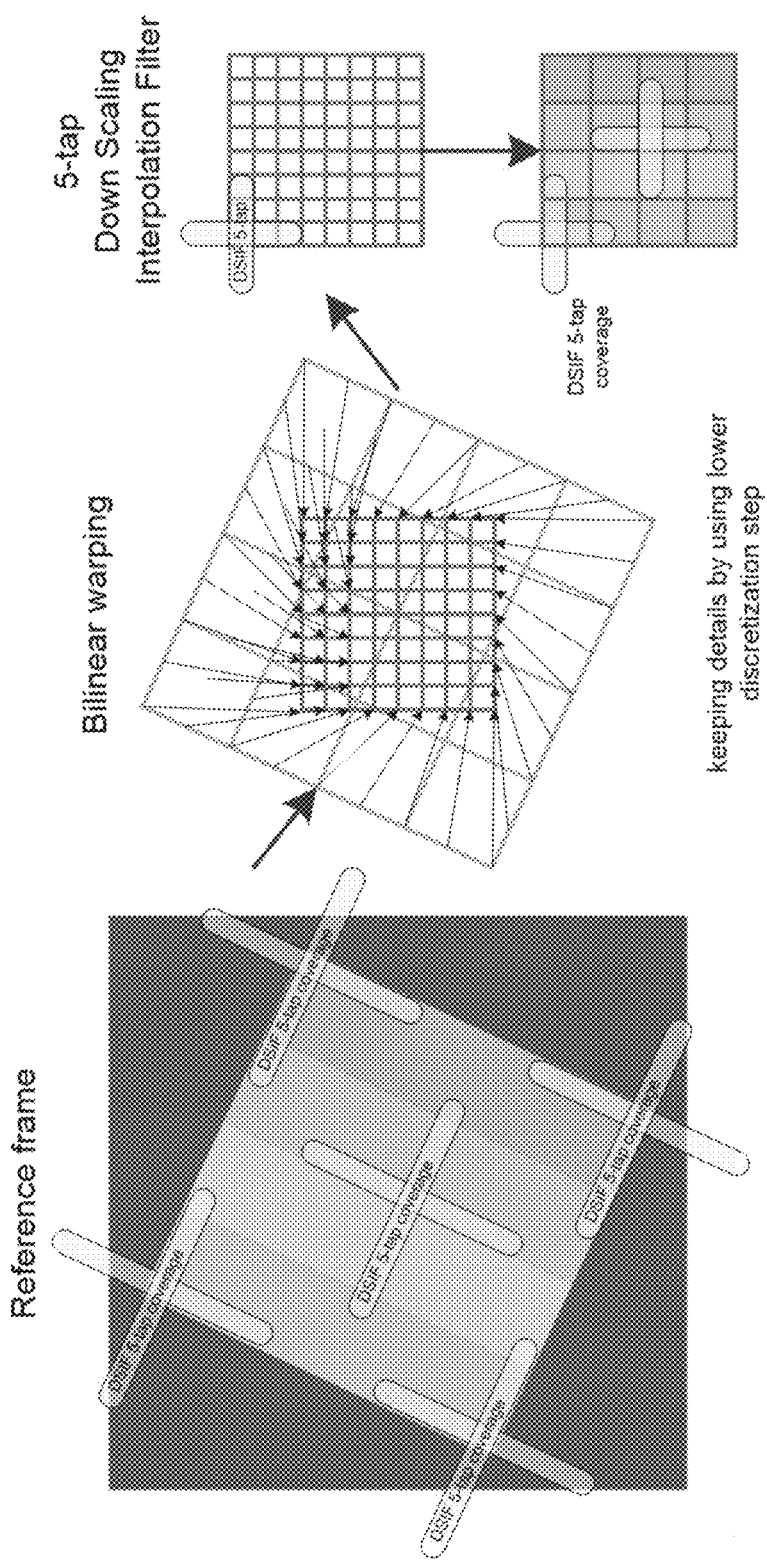
FIG. 11 shows a schematic diagram illustrating different aspects of an interpolation process implemented in an inter prediction apparatus according to an embodiment.

FIG. 11 illustrates different stages of the processing performed by the processing unit of the apparatus 144, 244 using a 5-tap filter in the vertical and the horizontal direction for the example shown in FIG. 10. As in the example shown in FIG. 10, the reference block is enlarged and rotated (corresponding to an affine transformation) relative to the current block, the 5-tap filters, which are vertical and horizontal in the current frame, are rotated in the reference frame.

In the following further embodiments of the inter prediction apparatus 144, 244, the encoding apparatus 100 and the decoding apparatus 200 will be described. In this context it will be understood that embodiments of the inter prediction apparatus 144, 244 relate to embodiments of the inter prediction apparatus 144 as implemented in the encoding apparatus 100 as well as embodiments of the inter prediction apparatus 244 as implemented in the decoding apparatus 200.

In an embodiment, the processing unit of the apparatus 144, 244 is further configured to determine a respective motion vector of each of the sub-integer pixels of the filter support pixels in the current frame on the basis of the motion vector of the current full-integer pixel and one or more motion vectors of neighboring full-integer pixels of the current full-integer pixel. To this end, in an embodiment, the processing unit of the apparatus 144, 244 is configured to determine a mean vector of the motion vector of the current full-integer pixel and one or more motion vectors of neighboring full-integer pixels of the current full-integer pixel. For instance, for determining the motion vector of the half-integer pixel above the current full-integer pixel in the current frame the processing unit of the apparatus 144, 244 can compute the average, i.e. mean of the motion vector of the current full-integer pixel and the motion vector of the neighboring full-integer pixel above the current full-integer pixel.

Similar to the determination of the motion vector of the current pixel the processing unit of the apparatus 144, 244 can be configured to determine the one or more motion vectors of neighboring full-integer pixels of the current full-integer pixel on the basis of the current frame and the reference frame of the video signal and/or a motion compensation model.

In an embodiment, the processing unit of the apparatus 144, 244 is configured to determine the inter predicted pixel value of the current pixel in the current frame by applying a spatial high-pass filter to the pixel value of the corresponding sub-integer pixel of the current full-integer pixel in the reference frame and to the pixel values of the corresponding filter support pixels in the reference frame, in case the motion vector of the current full-integer pixel is determined on the basis of a non-translational motion compensation model, and to determine the inter predicted pixel value of the current pixel in the current frame on the basis of a conventional scheme, such as the conventional scheme defined in H.264/AVC and H.265/HEVC, in case the motion vector of the current full-integer pixel is determined on the basis of a translational motion compensation model. In an embodiment, the non-translational motion compensation model is an affine, warping and/or panoramic motion compensation model.

Figure 12:
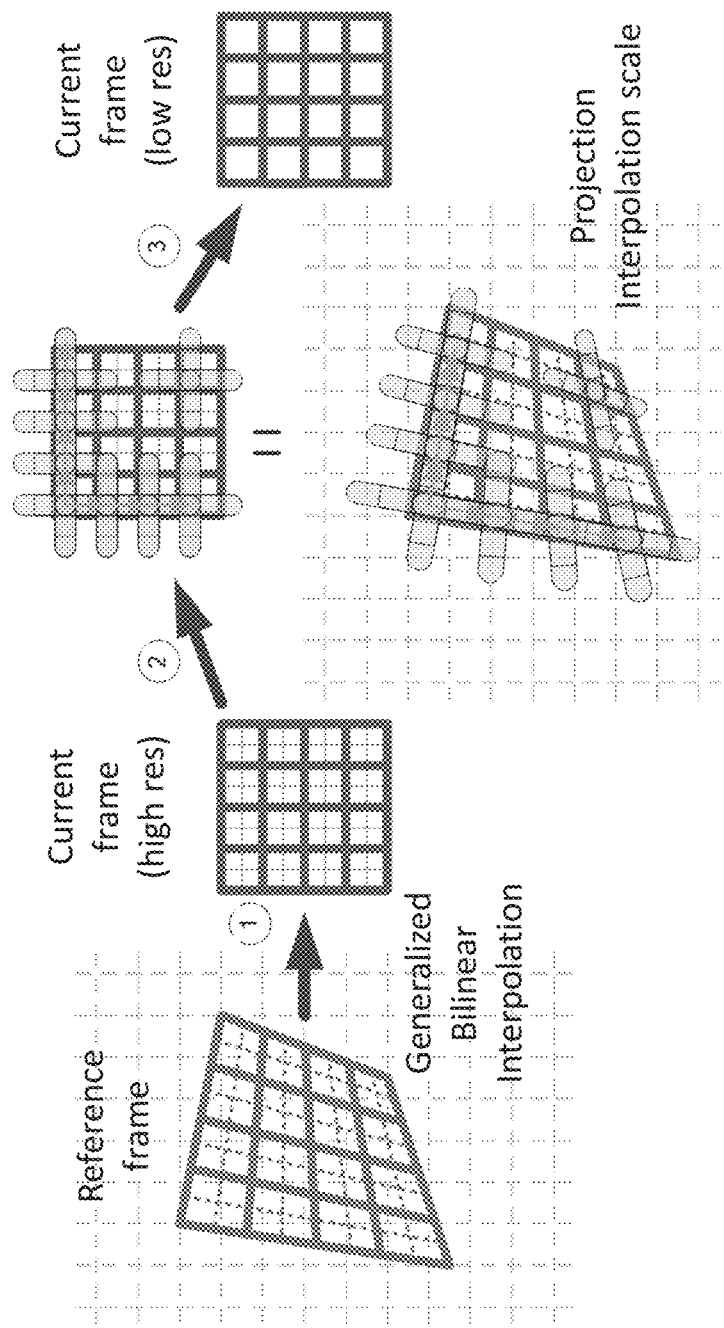
FIG. 12 shows a schematic diagram illustrating different aspects of an interpolation process implemented in an inter prediction apparatus according to an embodiment.

FIG. 12 summarizes several aspects of embodiments of the disclosure described above.

Figure 13:
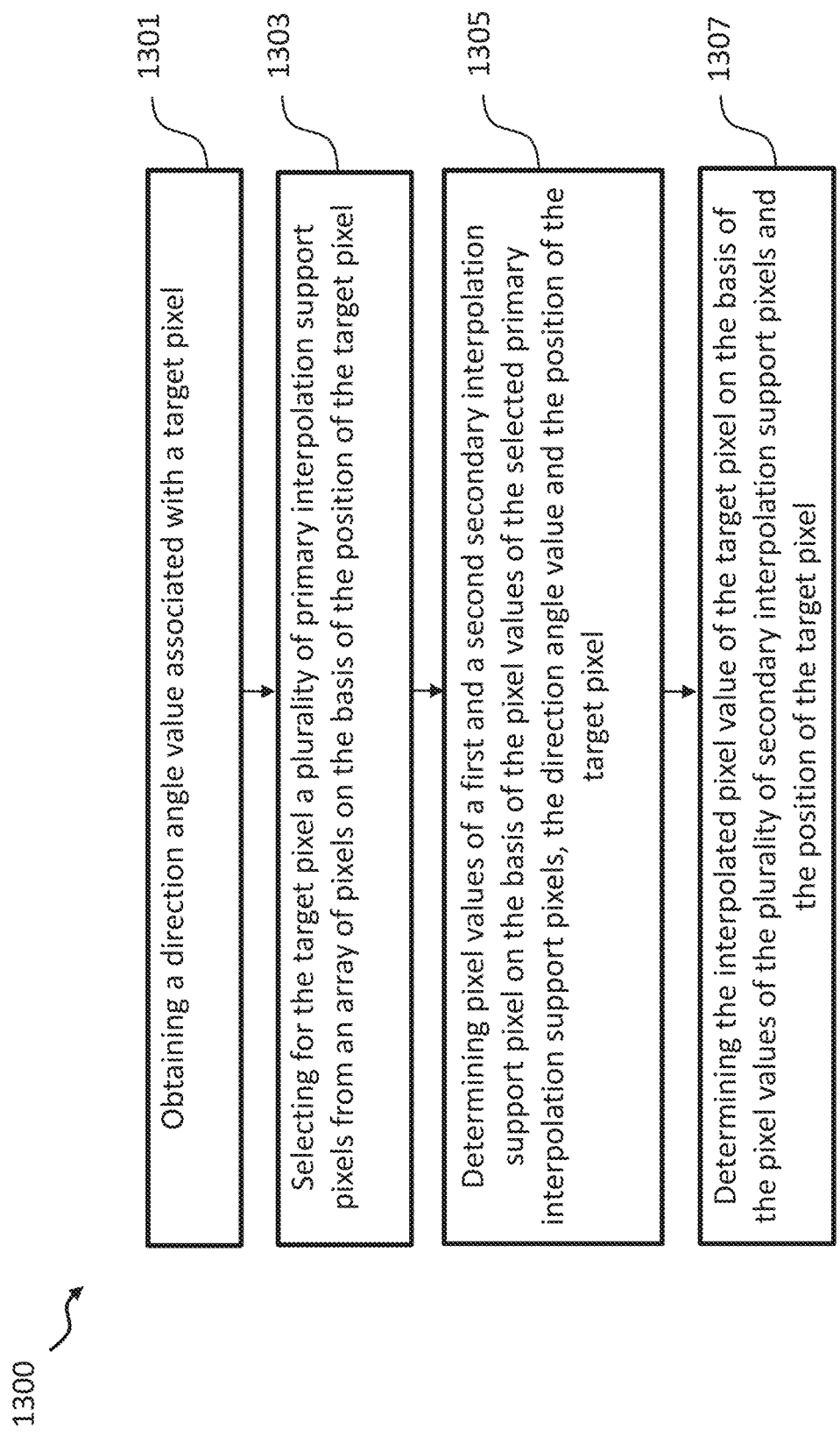
FIG. 13 shows a flow diagram illustrating steps of an inter prediction method according to an embodiment.

FIG. 13 shows a flow diagram illustrating steps of a method 1300 for determining on the basis of an image defining a plurality of pixel values of an array of pixels, in particular full-integer pixels 10*a*-*d* an interpolated pixel value of a target, in particular sub-integer pixel 12*a*-*c*. The method 1300 comprises the steps of: obtaining 1301 a direction angle value a, b associated with the target pixel 12*a*-*c*; selecting 1303 for the target pixel 12*a*-*c* a plurality of primary interpolation support pixels 10*a*-*d* from the array of pixels 10*a*-*d* on the basis of the direction angle value a, b and the position of the target pixel 12*a*-*c*; determining 1305 pixel values of a first and a second secondary interpolation support pixels 11*ac*, 11*bd* on the basis of the pixel values of the selected primary interpolation support pixels 10*a*-*d*, the direction angle value a, b and the position of the target pixel 12*a*-*c*; and determining 1307 the interpolated pixel value of the target pixel 12*a*-*c* on the basis of the pixel values of the first and the second secondary interpolation support pixels 11*ac*, 11*bd* and the position of the sub-integer pixel 12*a*-*c*, in particular the horizontal or vertical position of the target pixel 12*a*-*c*.

The above described interpolation scheme can be implemented as well for interpolation of data other than pixel values.

Thus, the interpolation scheme according to the disclosure can be implemented in a data processing apparatus for determining on basis of a plurality of sample values of a multi-dimensional, in particular two-dimensional array of samples, in particular full-integer samples or data points, an interpolated sample value of a target sample, in particular sub-integer target sample, wherein the data processing apparatus comprises processing circuitry configured to: obtain a direction angle value associated with the target sample; select for the target sample a plurality of primary interpolation support samples from the array of samples on the basis of the direction angle value and the position of the target sample; determine sample values of a plurality of secondary interpolation support samples on the basis of the sample values of the selected interpolated support samples, the direction angle value and the position of the target sample; and determine the interpolated sample value of the target sample on the basis of the sample values of the plurality of secondary interpolation support samples and the position of the target sample, in particular the horizontal or vertical position of the target sample.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

The invention claimed is:

1. An image processing apparatus for determining, on the basis of an image defining a plurality of pixel values of an array of pixels, an interpolated pixel value of a target pixel, wherein the image processing apparatus comprises processing circuitry configured to:
   obtain a direction angle value (a, b) associated with the target pixel;
   select for the target pixel a plurality of primary interpolation support pixels from the array of pixels on the basis of the position of the target pixel;

determine pixel values of a first and a second secondary interpolation support pixels on the basis of the pixel values of the selected primary interpolation support pixels, the direction angle value (a, b) and the position of the target pixel; and determine the interpolated pixel value of the target pixel on the basis of the pixel values of the first and the second secondary interpolation support pixels and the position of the target pixel;

wherein the plurality of primary interpolation support pixels of the target pixel includes one or more primary interpolation support pixels of a previously interpolated target pixel and/or wherein the plurality of secondary interpolation support pixels includes one or more secondary interpolation support pixels of a previously interpolated target pixel.

2. The image processing apparatus of claim 1, wherein the array of pixels defines a horizontal direction and a vertical direction and wherein the direction angle value (a, b) is the acute angle between a straight line passing through the target pixel and the horizontal direction.

3. The image processing apparatus of claim 2, wherein the processing circuitry is configured to obtain the direction angle value (a, b) by determining the direction angle value (a, b) as the angle defined between the horizontal direction and the straight line passing through the target pixel and connecting the target pixel with a further target pixel to be interpolated.

4. The image processing apparatus of claim 2, wherein the direction angle value (a, b) lies in the range from 0° to 45° and wherein the position of the first secondary interpolation support pixel is defined by the intersection point between a straight line passing through the target pixel with the direction angle value (a, b) and a first vertical line connecting two of the plurality of primary interpolation support pixels and wherein the position of the second secondary interpolation support pixel is defined by the intersection point between the straight line passing through the target pixel with the direction angle value (a, b) and a second vertical line connecting two other of the plurality of primary interpolation support pixels.

5. The image processing apparatus of claim 4, wherein the processing circuitry is configured to determine the pixel value of the first secondary interpolation support pixel as a weighted sum of the two of the plurality of primary interpolation support pixels, wherein the weighted sum depends on the respective vertical distances between each of the two of the plurality of primary interpolation support pixels and the first secondary interpolation support pixel, and to determine the pixel value of the second secondary interpolation support pixel as a weighted sum of the two other of the plurality of primary interpolation support pixels, wherein the weighted sum depends on the respective vertical distances between each of the two other of the plurality of primary interpolation support pixels and the second secondary interpolation support pixel.

6. The image processing apparatus of claim 4, wherein the processing circuitry is configured to determine the interpolated pixel value of the target pixel as a weighted sum of the pixel values of the first and the second secondary interpolation support pixels, wherein the weighted sum depends on the horizontal distance between the position of the first secondary interpolation support pixel and the position of the target pixel and on the horizontal distance between the position of the second secondary interpolation support pixel and the position of the target pixel.

7. The image processing apparatus of claim 2, wherein the direction angle value (a, b) lies in the range from 45° to 90° and wherein the position of the first secondary interpolation support pixel is defined by the intersection point between a straight line passing through the target pixel with the direction angle value (a, b) and a first horizontal line connecting two of the plurality of primary interpolation support pixels and wherein the position of the second secondary interpolation support pixel is defined by the intersection point between the straight line passing through the target pixel with the direction angle value (a, b) and a second horizontal line connecting two other of the plurality of primary interpolation support pixels.

8. The image processing apparatus of claim 1, wherein the position of the target pixel defines a current cell of the array of pixels and wherein the plurality of primary interpolation support pixels comprise one or more pixels from the array of pixels located at one or more corners of the current cell of the array of pixels.

9. The image processing apparatus of claim 1, wherein the processing circuitry is further configured to apply an intermediate rounding operation.

10. A method for determining, on the basis of an image defining a plurality of pixel values of an array of pixels, an interpolated pixel value of a target pixel, wherein the method comprises:

obtaining a direction angle value (a, b) associated with the target pixel;

selecting for the target pixel a plurality of primary interpolation support pixels from the array of pixels on the basis of the position of the target pixel;

determining pixel values of a first and a second secondary interpolation support pixels on the basis of the pixel values of the selected primary interpolation support pixels, the direction angle value (a, b) and the position of the target pixel; and determining the interpolated pixel value of the target pixel on the basis of the pixel values of the first and second secondary interpolation support pixel and the position of the target pixel;

wherein the plurality of primary interpolation support pixels of the target pixel includes one or more primary interpolation support pixels of a previously interpolated target pixel and/or wherein the plurality of secondary interpolation support pixels includes one or more secondary interpolation support pixels of a previously interpolated target pixel.

11. An apparatus for inter prediction of a pixel value of a current full-integer pixel of a plurality of pixels of a current block of a current image frame of a video signal, wherein the apparatus comprises a processing unit configured to:

determine a motion vector of the current full-integer pixel on the basis of the current image frame and a reference frame of the video signal and/or a motion compensation model;

determine for the current full-integer pixel a corresponding sub-integer pixel in the reference frame on the basis of the motion vector of the current full-integer pixel; and generate, on the basis of a predefined set of filter support pixels in the current frame, a set of corresponding filter support pixels in the reference frame, wherein the predefined set of filter support pixels in the current frame comprises one or more neighboring full-integer pixels and/or sub-integer pixels of the current full-integer pixel;

wherein the apparatus further comprises an image processing apparatus, wherein the image processing apparatus is configured to determine a respective interpolated pixel value of the corresponding sub-integer pixel of the current full-integer pixel and the corresponding filter support pixels in the reference frame; and wherein the processing unit is further configured to determine the inter predicted pixel value of the current pixel in the current frame by applying a spatial high-pass filter to the interpolated pixel value of the corresponding sub-integer pixel of the current full-integer pixel in the reference frame and to the pixel values of the corresponding filter support pixels in the reference frame.

12. The apparatus of claim 11, wherein the predefined set of filter support pixels in the current frame comprises one or more vertically and/or horizontally neighboring half-integer pixels of the current full-integer pixel in the current frame.

13. The apparatus of claim 11, wherein the predefined set of filter support pixels in the current frame comprises one or more vertically and/or horizontally neighboring full-integer pixels of the current full-integer pixel in the current frame.

14. The apparatus of claim 11, wherein the spatial high-pass filter is a 5-tap filter, and the predefined set of filter support pixels in the current frame comprises one or more neighboring full-integer pixels and half-integer pixels of the current full-integer pixel and wherein the 5-tap filter has the following filter coefficients (−6, 9, 26, 9, −6).

15. The apparatus of claim 11, wherein the spatial high-pass filter is a 5-tap or a 3-tap filter, and the predefined set of filter support pixels in the current frame comprises one or more neighboring full-integer pixels and/or half-integer pixels of the current full-integer pixel and wherein the 5-tap filter has the following filter coefficients (−1, 0, 10, 0, −1) or the 3-tap filter has the following filter coefficients (−1, 10, −1).

16. The apparatus of claim 11, wherein the processing unit of the apparatus is further configured to determine a respective motion vector of each of the sub-integer pixels of the filter support pixels in the current frame on the basis of the motion vector of the current full-integer pixel and one or more motion vectors of neighboring full-integer or half-integer pixels of the current full-integer pixel.

17. The apparatus of claim 16, wherein the processing unit of the apparatus is configured to determine a respective motion vector of each of the sub-integer pixels of the filter support pixels in the current frame by determining a mean vector of the motion vector of the current full-integer pixel and one or more motion vectors of neighboring full-integer pixels of the current full-integer pixel.

18. The apparatus of claim 16, wherein the processing unit of the apparatus is further configured to determine the one or more motion vectors of neighboring full-integer pixels of the current full-integer pixel on the basis of the current frame and the reference frame of the video signal and/or a motion compensation model.

19. The apparatus of claim 11, wherein the processing unit of the apparatus is configured to determine the inter predicted pixel value of the current pixel in the current frame by applying a spatial high-pass filter to the pixel value of the corresponding sub-integer pixel of the current full-integer pixel in the reference frame and to the pixel values of the corresponding filter support pixels in the reference frame, if the motion vector of the current full-integer pixel is determined on the basis of a non-translational motion compensation model, and to determine the inter predicted pixel value of the current pixel in the current frame on the basis of a conventional scheme, if the motion vector of the current full-integer pixel is determined on the basis of a translational motion compensation model.

* * * * *